UNITED STATES PATENT OFFICE.

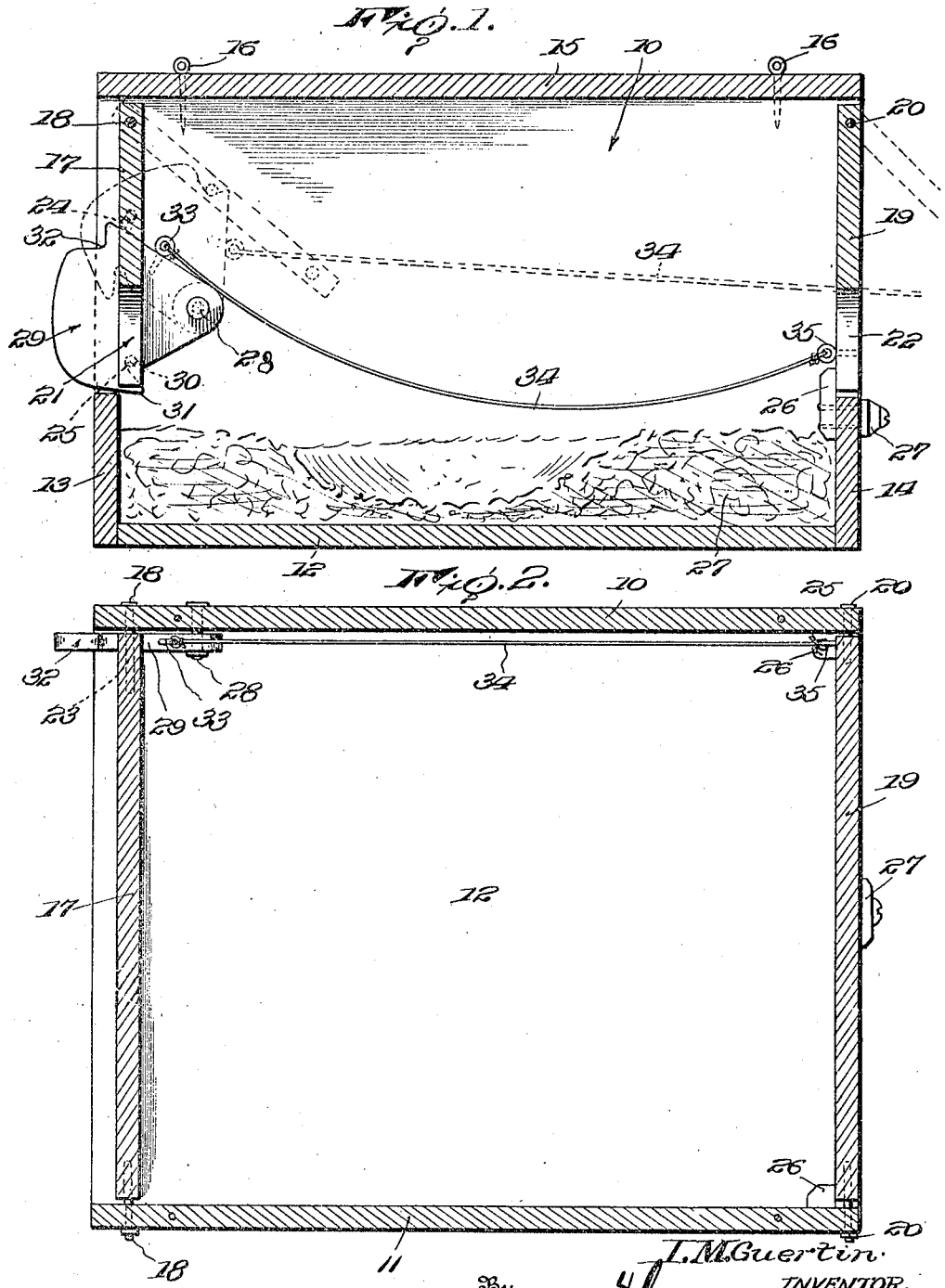

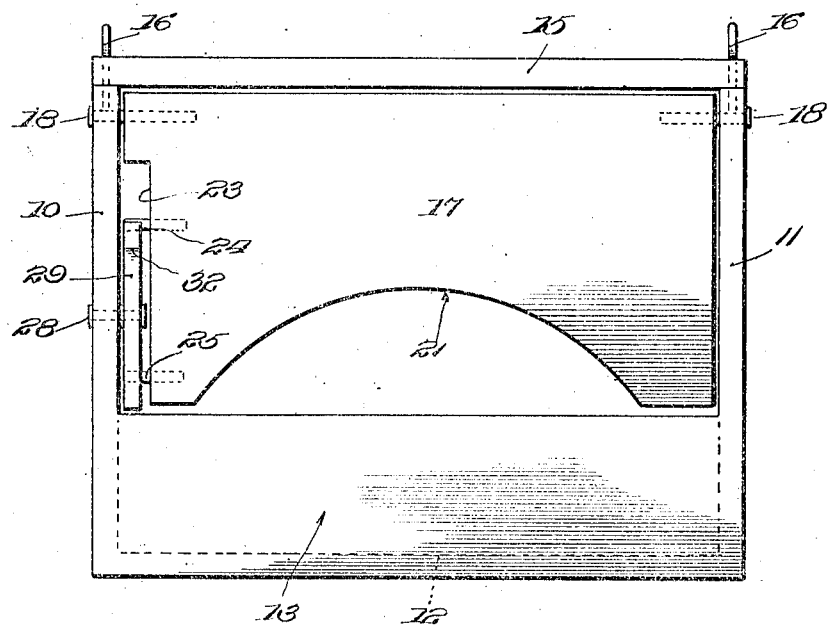
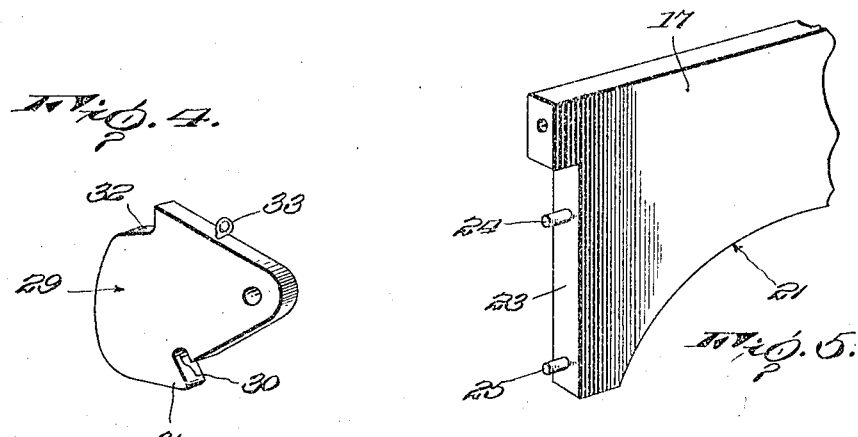

IRÉNÉE M. GUERTIN, OF ARCTIC CENTRE, RHODE ISLAND.

TRAP-NEST.

1,291,852.  Specification of Letters Patent.  Patented Jan. 21, 1919.

Application filed November 7, 1917. Serial No. 200,792.

*To all whom it may concern:*

Be it known that I, IRÉNÉE M. GUERTIN, a citizen of the United States, residing at Arctic Centre, in the county of Kent and State of Rhode Island, have invented certain new and useful Improvements in Trap-Nests, of which the following is a specification.

This invention relates to improvements in trap nests, and has for one of its objects to simplify and improve the construction and increase efficiency and utility of devices of this character.

Another object of the invention is to provide a trap nest in which provision is made for causing the hen when leaving the nest, after having laid an egg, to actuate a trip device and cause the release of the closure at the inlet end of the nest, to permit another hen to enter.

Another object of the invention is to provide a device of this character including inwardly and outwardly swinging doors connected to move in unison and adapted to actuate a trip device by the movements of the doors, whereby the inwardly swinging or entering door is locked in closed position when a hen is on the nest and thus protecting her from the obtrusion of other hens.

With these and other objects in view, the invention consists in certain novel features of construction, as hereinafter shown and described and then specifically pointed out in the claims; and in the drawings illustrative of the preferred embodiment of the invention—

Figure 1 is a longitudinal sectional elevation.

Fig. 2 is a plan view with the cover removed.

Fig. 3 is an elevation at the front or inlet end of the device.

Fig. 4 is a detached perspective view of the combined trip and lock member.

Fig. 5 is a perspective view of a portion of the inlet door or closure.

The improved device comprises a body portion, preferably oblong in outline, and including side portions 10—11, a bottom 12, a forward or intake end 13 and a rear or outlet end 14. The top 15 of the improved nest is preferably detachable and connected to the sides 10—11 by eye bolts or like devices 16.

The eye bolts thus serve the two-fold purpose of means for securing the top 15 detachably to the sides 10—11 to enable the nest to be readily cleansed, and also providing means whereby the nest may be suspended by rods, cords, or like devices if required.

The ends 13—14 of the nest extend only a portion of the distance between the bottom 12 and the top 15, leaving the larger portions of the ends of the nest open. Fitting within the intake end of the nest between the upper edge of the end member 13 and the top 15 is a door 17 swingingly united at 18 to the sides 10 and 11, and likewise fitting within the outlet end of the nest between the end member 14 and the top 15 is a similar member 19, swingingly united to the sides as shown at 20. The member 17 is formed with the lower portion cut out as shown at 21, while the lower portion of the member 19 is similarly cut out as indicated at 22. The member 17 is provided with a recess or notch 23 into which stops or pins 24—25, carried by the member 17 extend, as shown in Figs. 3 and 5, the object to be hereafter explained.

Stop cleats 26 or like devices are attached to the end member 14 of the nest and extend into the path of the member 19 to prevent its inward movement, while a button 27 is attached to the outer face of the member 14 and adapted to be moved into the path of the member 19 to lock the latter in closed position, if required.

The space between the sides 10—11 and the ends 13—14 is provided with suitable nest material such as hay, straw or the like and indicated in Fig. 1.

Pivoted at 28 to one of the side members, for instance the member 10, is a combined trip and stop indicated as a whole at 29.

The pivot 28 is located near the inner end of the member 29 so that the latter will swing by gravity thereon.

The member 29 is formed with an open recess 30 in its lower face with the material at one side of the recess extending beyond the recess, as shown at 31. Another open recess is formed at 32 at the opposite side of the member 29, while an eye 33 is connected to the member 29 between the pivot 28 and the recess 32. A pull cord or cable 34 is connected at one end at 35 to the outlet door 19 and at the other end to the eye 33 as shown in Figs. 1 and 2.

When the parts are in the position shown more particularly in Fig. 1 the stop or pin 25 will be received in the recess 30 and thus hold the inlet door 17 locked in closed position, while the stop or pin 24 bears upon the portion of the trip device just in advance of the recess 32, both doors then being closed.

To "set" the nest, the attendant manually elevates the outer projecting portion of the trip and thus releases the stop or pin 25 and at the same time causes the upper portion of the trip to engage against the stop 24 and swing the door 17 inwardly until the stop 24 drops by the gravity of the door into the recess 32 and locks the door 17 in open position as shown by dotted lines in Fig. 1.

The door 17 is so constructed that when in initially open position, as shown by dotted lines in Fig. 1, the space between the hollow portion 21 and the member 13 will not be large enough to permit the hen to pass, but in attempting to pass into the nest the back of the hen will press against the door 17 and swing it farther inwardly and thus cause the stop 24 to pass beyond the recess 32 and permit the trip device to fall by gravity into its initial position as shown in full lines in Fig. 1. As the hen continues her forward movement into the nest, she passes from beneath the door 17 when the latter will fall by gravity into closed position and causes the stop 25 to slightly displace the trip, pass into the recess 30 and thus locks the door 17 in closed position both from inward and outward movement. The hen cannot therefore pass through the inlet end and is likewise protected from intrusion from other hens while in the nest, from both the inlet and outlet ends.

After the hen has laid the egg she will naturally endeavor to leave the nest through the relatively small opening 22 in the door 19, and in thus passing her back bears against the outwardly swinging outlet door and applies tension to the pull member 34 and causes it to swing the trip member upwardly and outwardly a short distance, which movement elevates the recess 30 and release the stop 25 and at the same time causes the trip to engage the stop 24 and swing the door 17 inwardly until the recess 32 is in position to receive the stop 24 and lock the door 17 in open position, thus automatically "setting" the nest for the next hen.

In the meantime the first hen passes from beneath the outlet door 19 and releases the latter which falls by gravity into closed position, as before.

By this arrangement the hen is effectually protected from intrusion while on the nest and can pass from the nest in one direction only, and in passing from the nest automatically sets the nest for the next hen.

The member 32 and the flexible member 28 are located in close proximity to one of the sides 10 or 11, and do not therefore interfere with the departing hen.

The nest and all attachments may be of metal or wood as may be preferred, or partly of wood and partly of metal, and it is not desired to limit the device to any specific material or to any specific size.

Having thus described the invention, what is claimed as new is:

1. In a trap nest an inwardly opening door provided with laterally directed stops in spaced relation, an outwardly opening door, a movable trip device having recesses in spaced relation and adapted to be engaged respectively by said stops, and a flexible element connected to said trip device and to said outwardly opening door.

2. In a trap nest an inwardly opening door provided with laterally directed stops in spaced relation, an outwardly opening door, a movable trip device having recesses in spaced relation and with an inclined face, said recesses and inclined face adapted to be engaged by said stops, and a flexible element connected to said trip device and to said outwardly opening door.

3. In a trap nest an inwardly opening door provided with laterally directed stops in spaced relation, an outwardly opening door, a trip device pivoted near one end and swinging by gravity on the pivot, said trip device having recesses in spaced relation and adapted to be engaged respectively by said stops, and a flexible element connected to said trip device and to said outwardly opening door.

In testimony whereof I affix my signature.

IRÉNÉE M. GUERTIN.

Copies of this patent may be obtained for five cents each, by addressing the "Commissioner of Patents, Washington, D. C."